March 11, 1930.  C. FROESCH  1,750,221
VEHICLE FRAME CONSTRUCTION
Filed May 25, 1928
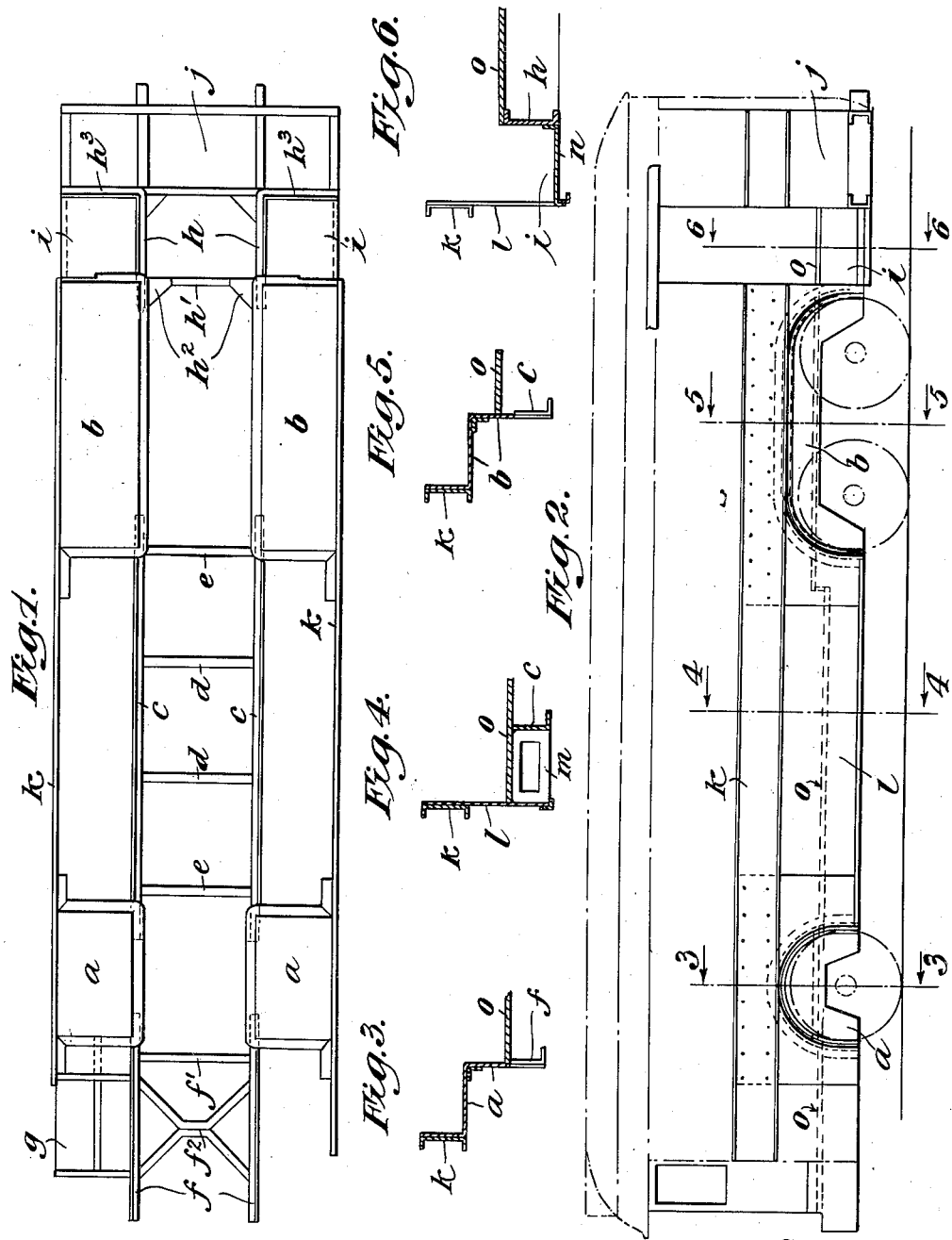
Inventor:
Charles Froesch
By his Attorneys
Redding, Greeley, O'Shea & Campbell Patented Mar. 11, 1930

1,750,221

UNITED STATES PATENT OFFICE

CHARLES FROESCH, OF TEANECK, NEW JERSEY, ASSIGNOR TO INTERNATIONAL MOTOR COMPANY, OF NEW YORK, N. Y., A CORPORATION OF DELAWARE

VEHICLE FRAME CONSTRUCTION

Application filed May 25, 1928. Serial No. 280,463.

The present invention relates to an improved construction of a vehicle frame wherein the conventional longitudinally extending channel frames of existing designs are replaced by longitudinally extending strengthening members which are mounted upon the wheel housings of the vehicle. As they are the basic strengthening members and points of support, the wheel housings are constructed of plate metal to have the required rigidity. In this manner, the wheel housings and longitudinally extending members form the base upon which the other elements of the body are mounted. More specifically, this invention relates to an improved body construction of the above character, wherein the longitudinal strengthening members are disposed intermediate the sides of the vehicle and connected to the inner sides of the wheel housings. By providing the strengthening elements in the manner set forth herein, they are effectively protected from injury due to collisions from either side and the elements mounted upon the strengthening members are more effectively secured in place. The power and driving units can be mounted directly upon the strengthening members without the necessity of providing further reinforcement for their support. Regardless of where doors are placed for entrance and exit from the body, their provision will necessitate no weakening of the frame since the longitudinal strengthening members are disposed in a manner such that they will be disturbed in no way in providing for the doors.

Further objects and advantages will appear as the description of the invention proceeds and reference will now be had to the accompanying drawings, wherein:

Figure 1 is a plan view of the basic strengthening members and wheel housings constructed in accordance with the present invention.

Figure 2 is a side elevation of a vehicle body with a frame as shown in Figure 1.

Figure 3 is a view in section, taken on line 3—3 of Figure 2, and looking in the direction of the arrows.

Figure 4 is a view in section, taken on line 4—4 of Figure 2, and looking in the direction of the arrows.

Figure 5 is a view in section, taken on line 5—5 of Figure 2, and looking in the direction of the arrows.

Figure 6 is a view in section taken on line 6—6 of Figure 2, and looking in the direction of the arrows.

Referring to the above drawings, $a$ designates the front wheel housings and $b$ the rear wheel housings. The latter are shown as constructed to accommodate two driving wheels on either side of the vehicle. Connecting the front and rear wheel housings on each side of the frame, are longitudinally extending strengthening members $c$ which terminate at the rear wheel housings and, at this point, are connected thereto as shown in dotted lines in Figure 1. The front ends of the longitudinally extending members are secured in like manner to the front wheel housings, thus tying the wheel housings on the respective sides rigidly together. Gross ties $d$ at the center, and $e$ at the ends, serve to connect the wheel housings and longitudinal strengthening members of each side rigidly together. Forwardly from the front wheel housings, extensions $f$ are provided for supporting the front of the vehicle. These extensions are secured to the front wheel housings as clearly shown in Figure 1 and are provided with transverse bracing members $f'$ and $f^2$. Front steps $g$ are carried by the forwardly extending members.

Rearwardly from the rear wheel housings, extension members $h$ are provided. A transverse member $h'$ connects the rearwardly extending members and wheel housings together and suitable gusset plates $h^2$ serve to reinforce the structure. The extension members $h$ extend outwardly at $h^3$ to form wells $i$ upon either side of the vehicle. These wells form portions in which doors may be constructed. As a means for further strengthening the rear of the frame, a transverse frame $j$ is mounted upon the rearwardly extending members $h$, this frame serving to support the power unit of the vehicle in any well known manner.

Outer belt plates $k$ extend along the side of the frame and are secured to the outer sides of the front and rear wheel housings. These belt plates may carry the sides of the vehicle and support the super-structure necessary for the body. In the section shown in Figures 3 to 6, the side of the vehicle is indicated at $l$ and intermediate the front and rear wheel housings, standardized spacers $m$ of light sheet metal are provided for strengthening the sides. The section shown in Figure 6, illustrates a step $n$ carried by the rearwardly extending members $h$, the latter also carrying the floor members $o$.

The specific arrangement of associated elements carried by the main strengthening and supporting members can be varied to suit the requirements of individual designs and the invention is not to be limited, save as defined in the appended claims.

I claim as my invention:

1. A vehicle frame comprising front and rear wheel housings, longitudinal strengthening members connected to the wheel housings at their inner sides, transverse strengthening members connecting the elements at either side, vertical flanges formed on the outer sides of the wheel housings, and outer belt plates secured to the flanges.

2. A vehicle frame having its side members composed of longitudinally extending side frame members, unitary frame members adjacent the wheels, said last-named members having flat portions curved over the wheels and vertical flat portions extending longitudinally of the frame integral with the first-named portions and inwardly of the wheels, respectively, constituting wheel housings, and means to secure the first named members adjacent their ends to the vertical portions of the wheel housings, respectively.

This specification signed this 15th day of May, A. D. 1928.

CHARLES FROESCH.